United States Patent
Riggs

(10) Patent No.: US 7,270,107 B2
(45) Date of Patent: Sep. 18, 2007

(54) BOLTED PRE-COMBUSTION CHAMBER

(75) Inventor: Thomas C. Riggs, Tomball, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 11/336,729

(22) Filed: Jan. 20, 2006

(65) Prior Publication Data

US 2007/0169740 A1 Jul. 26, 2007

(51) Int. Cl.
*F02B 19/00* (2006.01)
*F02M 1/00* (2006.01)
(52) U.S. Cl. .................. 123/260; 123/275
(58) Field of Classification Search ........... 123/260, 123/261, 266, 275
See application file for complete search history.

(56) References Cited

U.S. PATENT DOCUMENTS

| 4,303,045 | A | * | 12/1981 | Austin, Jr. | ......... 123/266 |
| 4,542,724 | A | * | 9/1985 | Blais | ......... 123/266 |
| 5,203,298 | A | * | 4/1993 | Manolis | ......... 123/275 |
| 5,662,082 | A | * | 9/1997 | Black et al. | ......... 123/254 |
| 5,778,849 | A | * | 7/1998 | Regueiro | ......... 123/254 |

* cited by examiner

*Primary Examiner*—John T. Kwon
(74) *Attorney, Agent, or Firm*—Manish Vyas; Peter Bielinski; Fletcher Yoder

(57) ABSTRACT

A pre-combustion chamber for an engine is made more simply removable from the cylinder head by integrating the chamber design and not threading the assembly to the head. The assembly is provided as an integrated design using a seal that helps dissipate heat from the spark plug and a cover that is held down by flange bolts that extend into threaded bores into the head in a location more removed from the heat generated in the chamber. As a result the chamber is more simply installed and removed without damage to the head.

13 Claims, 1 Drawing Sheet

BOLTED PRE-COMBUSTION CHAMBER

FIELD OF THE INVENTION

The field of this invention is pre-combustion chambers and, by way of example, relates to removable pre-combustion chambers employed in natural gas burning internal combustion engines.

BACKGROUND OF THE INVENTION

Normally, in internal combustion engines that burn natural gas, the spark plug is received by a pre-combustion chamber. The gas is fed into the pre-combustion chamber, and the ignited gas enters the cylinder when the piston is at top dead center to initiate the power stroke for that piston. The use of a pre-combustion chamber improves combustion stability within the engine, for instance.

FIG. 1 is a view of the prior art design. The pre-combustion chamber 10 has a generally cylindrical shape with an exit port 12 that is specifically oriented with regard to the cylinder where the piston reciprocates. The chamber has a flange 14 that rests on a shoulder 16 that surrounds a receptacle or opening in the cylinder head 20. A retaining ring 18 is attached to the cylinder head 20 via thread 22 that extends into the opening in the head 20. After the ring 18 is threaded using a tool that engages internal notches (not shown), a cover 24 is threaded into the same thread 22 in the head 20. Cover 24 has a receptacle 26 with a thread 28 to accept a spark plug 30. A passage 32 leads into chamber 10 to allow fuel, such as natural gas to enter when the plug 30 is fired. The combusted fuel leaves through port 12 to enter the cylinder for the power stroke of the piston (not shown).

The problem with the prior design just described occurs when it is time to remove the cover 24 and extract the retaining ring 18. Both of these items need to be removed to get the chamber 10 out of the head 20. The problem is that removal can become problematic as either the ring 18 or the cover 24 can get stuck on thread 22. If the thread 22 is damaged during this removal, the entire head 20 may require complete replacement. Because these engines can be quite large, the delay in obtaining another head can be lengthy. Moreover, the expense of replacing the head 20 can also be significant. The problem is aggravated by the enormous heat repeatedly generated in the vicinity of the spark plug, which over time seemingly fuses the thread 22 to the head 20 making disassembly difficult without damaging the head 20. In addition, the ring 18 and the cap 24 operate under a predetermined torque, which when combined with the heat cycling and exposure to combustion products and deposits aggravates the removal process. These chambers are a component that must be periodically replaced and it is desirable to be able to remove these chambers without damage to the head 20.

SUMMARY OF THE INVENTION

Certain embodiments of the present invention present a new design that deals with the removal problems from the traditional designs and reduces the likelihood that the components will come out without damage to the head 20, to the extent that operators in the past have insisted that the repair only be made with a replacement head. In fact, exemplary embodiments of the present invention involve recognition of what aggravated the problems in the past as well as a new approach that rethinks the prior design with an eye toward the periodic disassembly and maintenance that is required for these components. Those skilled in the art will have a better appreciation for the invention from a review of the description of exemplary embodiments, and the drawings and the claims that appear below.

By way of example, a pre-combustion chamber for an engine is made more simply removable from the cylinder head by integrating the chamber design and not threading the assembly to the head. The assembly is provided as an integrated design using a seal that helps dissipate heat from the spark plug and a cover that is held down by nuts and studs that extend into threaded bores into the head in a location more removed from the heat generated in the chamber. As a result the chamber is more simply installed and removed without damage to the head.

DETAILED DESCRIPTION OF EXEMPLARY EMBODIMENTS

Figure 1:
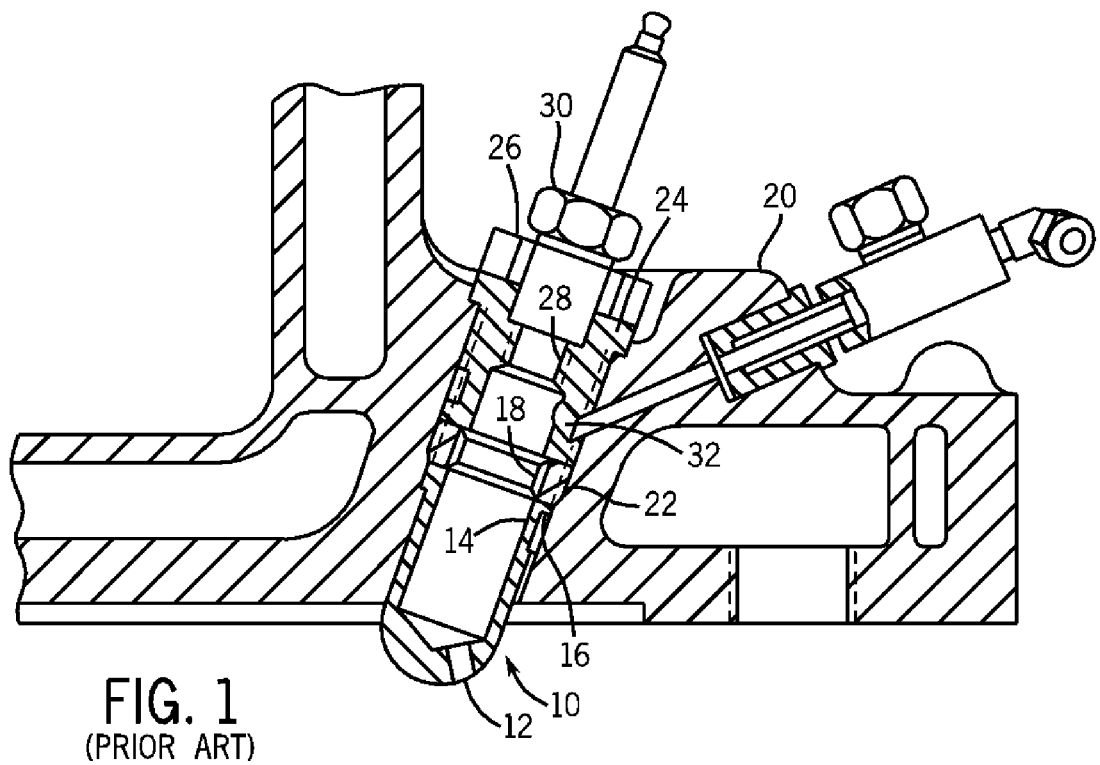
FIG. 1 is a view showing in section the prior art design.
Figure 2:
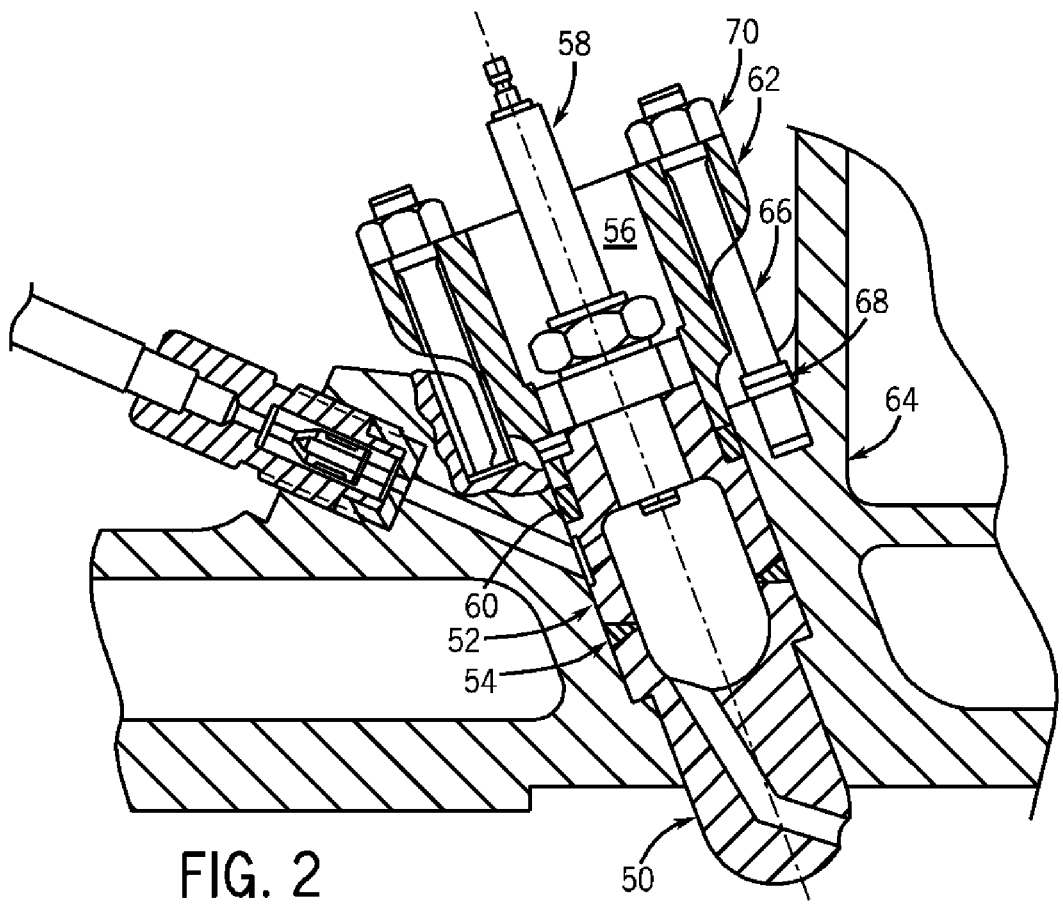
FIG. 2 shows in section an exemplary embodiment of the present invention.

Referring now to FIG. 2, it can be seen that the ring 18 of the prior design has been eliminated. The chamber 50 has been attached to an upper body 52 at weld 54. The upper body 52 has the receptacle 56 to accept the spark plug 58. A thermally conductive gasket 60 seals between the upper body 52 and the cover flange 62 that acts as a retainer that holds the assembly to the head 64 with nuts 70 and studs 66 that extend into threaded bores 68 that are further removed from the chamber assembly than the thread 22 of the prior design. Besides, bores 68 are not in communication with the chamber 50 or the main combustion cylinder, and any problem with the threads in those bores will not make operators want to undergo the expense of another head. Instead, the threads may be rehabilitated, if possible, or the bore 68 will bored bigger and a thread insert will be installed to allow the reuse of the same diameter mounting studs for cover flange 62.

Those skilled in the art will appreciate that the seal 60 may be formed of material that can handle the operating temperatures and still have capabilities of sealing in the head 64 while conducting heat away from the area of spark plug 56. Clearly, materials with high thermal conductivity that can withstand the operating conditions while sealing are beneficial, copper being one example.

Those skilled in the art will appreciate that the present exemplary design eliminates threading the head 64. For that reason it reduces the potential risks in sticking the chamber assembly 50 and 52 in the head on removal and thus has the prospect of saving an expensive head replacement. Additionally, by recognizing that a problem with the past design was inadequate heat transfer at the area of the thread 22, the new design has not only eliminated the thread in the head 64 but it has also added a heat sink in the form of the seal 60 and has placed the flange studs 66 in blind threaded bores 68 to further make sure that the studs 66 can be easily removed or, if necessary, the bores 68 can be enlarged and an insert installed to get the same sized stud back in without having to replace the head 64. In other respects, the pre-combustion chamber details of the prior design have been retained in the present invention.

The above description is illustrative of exemplary embodiments, and many modifications may be made by those skilled in the art without departing from the invention whose scope is to be determined from the literal and equivalent scope of the claims below.

I claim:

1. A removable chamber for an engine, comprising:
   a body insertable into a receptacle extending into a head of an engine, wherein the body includes a spark plug receptacle and a pre-combustion chamber; and
   a retainer that holds said body in position, said retainer configured to be secured to said head outside said receptacle.

2. The chamber of claim 1, wherein:
   said body is configured to drop into said receptacle and be retained therein only by said retainer.

3. The chamber of claim 1, further comprising:
   a heat conducting member mounted between said body and said retainer.

4. The chamber of claim 3, wherein:
   said heat conducting member comprises a seal that is adapted to seal said body to the head.

5. The chamber of claim 1, wherein:
   said retainer comprises fasteners attached to the head at locations remote from said receptacle.

6. The chamber of claim 1, wherein:
   said body is a unitary construction.

7. The chamber of claim 1, wherein:
   said body comprises pieces welded together.

8. An engine assembly, comprising:
   a cylinder head having a receptacle;
   a pre-combustion chamber configured for insertion into the receptacle, wherein the pre-combustion chamber includes a spark plug receptacle; and
   a retainer having a first portion at least partially extending into the receptacle, wherein the pre-combustion chamber is secured to the cylinder head by the retainer external to the receptacle.

9. The engine assembly of claim 8, wherein the retainer has a unitary construction.

10. The engine assembly of claim 8, comprising a seal disposed in the receptacle between the pre-combustion chamber and the retainer.

11. The chamber of claim 1, comprising:
    the head of the engine coupled to the body by the retainer; and
    a spark plug coupled to the head of the engine by the body.

12. The chamber of claim 11, wherein the body comprises a passage through the side of the body that is connected to a source of natural gas.

13. The engine assembly of claim 8, comprising a spark plug threaded into the spark plug receptacle.

* * * * *